United States Patent [19]

Smith

[11] Patent Number: 4,565,476

[45] Date of Patent: Jan. 21, 1986

[54] INTERNAL HYDRAULIC CLAMP

[75] Inventor: Donald F. Smith, Fort Worth, Tex.

[73] Assignee: General Dynamics Corporation, Fort Worth, Tex.

[21] Appl. No.: 570,972

[22] Filed: Jan. 16, 1984

[51] Int. Cl.$^4$ .............................................. B23Q 3/06
[52] U.S. Cl. .................................. 409/225; 279/2 R; 409/903
[58] Field of Search ...................... 409/225, 233, 903; 279/2 R, 2 A; 242/72 R, 72.1, 72 B; 82/44; 269/48.1, 48.2, 48.3

[56] References Cited

U.S. PATENT DOCUMENTS

| | | | |
|---|---|---|---|
| 1,566,370 | 12/1925 | Briscoe | 82/44 X |
| 2,970,842 | 2/1961 | Drew | 279/2 |
| 2,996,301 | 7/1961 | Cox | 279/46 |
| 3,026,115 | 3/1962 | Brauer, Jr. et al. | 242/72.1 X |
| 3,050,313 | 9/1962 | Lengyel | 279/2 |
| 3,517,939 | 6/1970 | Jaehn | 279/2 R |
| 3,565,416 | 2/1971 | Williamson et al. | 269/48.1 X |
| 3,633,929 | 1/1972 | Morawski et al. | 279/2 R X |
| 3,871,670 | 3/1975 | Wright | 279/2 R |

FOREIGN PATENT DOCUMENTS 2319337 10/1973 Fed. Rep. of Germany ..... 269/48.1

Primary Examiner—Z. R. Bilinsky
Attorney, Agent, or Firm—James E. Bradley

[57] ABSTRACT

A device for securing a workpiece to a fixture for performing machining operations includes a tubular, radially expansible mandrel. The mandrel is carried in a passage provided in the fixture and extends into a hole provided in the workpiece. An expander stem is carried within a bore of the mandrel. The stem has an upper end that is tapered for expanding the mandrel. The lower end of the stem is connected to a hydraulic piston. A spring applies an upward force on the mandrel. A hydraulic cylinder moves the stem downwardly, while the spring retains the mandrel in a stationary position until it grips the workpiece. Then, the hydraulic force overcomes the force of the spring to pull the mandrel downward slightly to secure the workpiece to the fixture.

8 Claims, 3 Drawing Figures

INTERNAL HYDRAULIC CLAMP

The government has rights in this invention pursuant to contract number F33657-82-C-2034 awarded by the Department of the Air Force.

BACKGROUND OF THE INVENTION

1. Field of the Invention

This invention relates in general to devices for clamping parts to be machined, and in particular to a hydraulically actuated internal clamp for clamping billets for cutting operation on numerical control machines.

2. Description of the Prior Art

In the aircraft industry, many parts are fabricated from large slabs of aluminum known as billets. An initial step is cutting the billets with multiple head, numerical controlled, milling machines. The billet is clamped to a fixture below the milling machine head by various means. The clamps usually comprise bolts, straps or other types of mechanical clamps.

These types of clamps have a disadvantage in that the machine cutter has to go around the clamp, which is especially a problem in numerical control machining using multiple hand milling machines. Also, the clamps may have to be moved, removed or added during the machining sequence. Often, the machine operator must physically climb up on the machine bed to do anything with the clamps. This creates a loss in time and a hazardous safety problem. Many clamps and bolts used on machine tools are different sizes, adding to the confusion of selecting the correct device. This causes shutdowns to find lost clamps or replace missing components. Any loose or removable part on a machine tool is a serious obstacle to production requirements. Exposed surface clamping incurs a risk of a high speed cutter striking the clamp due to machine malfunction or error, also.

Locking collets have been known for some time. Generally, a locking collet comprises a tubular mandrel through which an expander stem is carried. Moving the expander stem in one direction expands the mandrel to lock the part to the mandrel. Normally, the expander stem is part of a spindle of the machine. Locking collets of this type have been used for machining gears and other parts.

While a locking collet may be acceptable for its particular task, in heavy cutting operations, such as concerned herein, a conventional locking collet would not have sufficient holddown power. Also, most locking collets protrude past the workpiece within which they are secured, creating an obstacle if attempted to be used with a numerical control milling machine. Moreover, these locking collets do not rigidly secure a workpiece to a flat supporting surface for cutting operations.

SUMMARY OF THE INVENTION

In this invention, a device is provided for securing a workpiece to a support surface of a fixture for performing heavy machining operations. The device includes a number of expanding mandrel assemblies for holding down a workpiece or billet. Each assembly includes a mandrel which protrudes through a passage in the fixture supporting surface and into a hole provided in the workpiece. An expander stem is carried within the bore of the mandrel. The stem has an upper end that protrudes past the mandrel and is tapered for expanding the mandrel. The upper end of the stem is preferably recessed within the hole in the workpiece so as to avoid an obstruction. A spring applies an upward force to the mandrel, while a stop cooperating with the mandrel limits the upward movement.

Hydraulic means pulls downwardly on the stem with hydraulic force to expand the upper end of the mandrel into gripping engagement with the workpiece. The spring keeps the mandrel in an upper position until the sides of the mandrel can expand out and tightly grip the workpiece. Then the spring force is overcome by the hydraulic force, which pulls the mandrel down a slight distance to hold the workpiece tightly against the supporting surface.

DESCRIPTION OF THE PREFERRED EMBODIMENT

Figure 1:
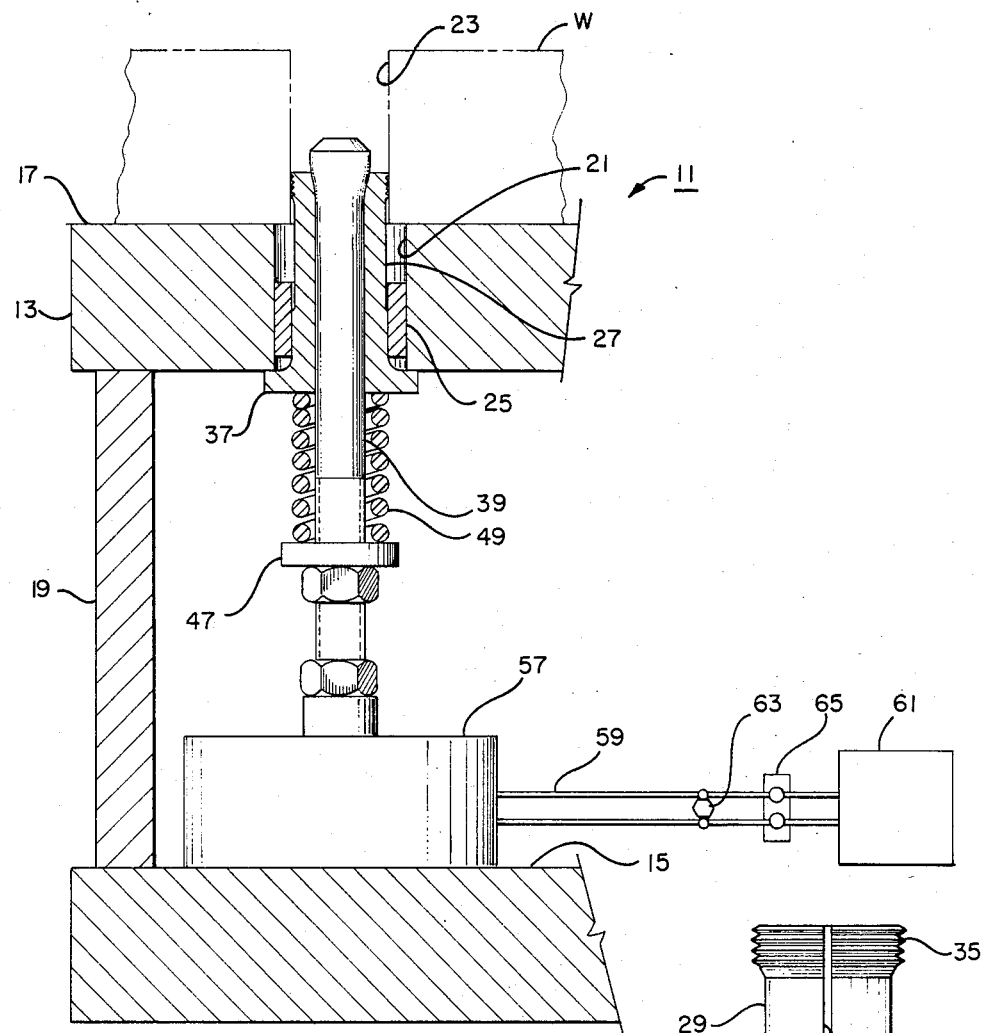
FIG. 1 is a sectional, partially schematic view of an internal clamp constructed in accordance with this invention.

Referring to FIG. 1, hydraulic clamp 11 includes a fixture 13. Fixture 13 is a metal structure having a base 15 and a support surface 17 located above base 15. Support surface 17 is a flat plate that is parallel with the horizontal base 15. Support surface 17 is adapted to support a workpiece "W" below a machine tool (not shown). Workpiece "W" often will be a solid block or billet of aluminum, into which a number of parts will be cut. Vertical supports 19, normally cylindrical columns, support the support surface 17 above the base 15.

The support surface 17 has a plurality of passages 21 (only one shown) that extend completely through the support surface. Each passage 21 is adapted to align co-axially with a hole 23 formed in the workpiece "W". Hole 23 must extend from the lower side of the workpiece "W", but does not necessarily have to extend completely through the workpiece "W". Hole 23 could be a blind hole extending from the lower side of workpiece "W" a selected distance upward.

Figure 3:
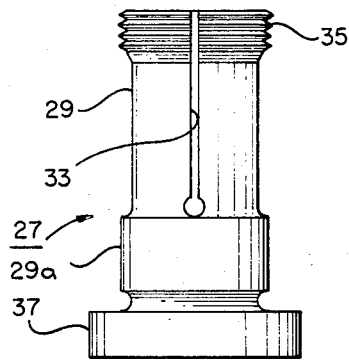
FIG. 3 is a side elevational view of the mandrel used with the clamp of FIGS. 1 and 2.

A sleeve or bushing 25 is stationarily secured within the support surface passage 21. Bushing 25 closely and slidingly receives a metal mandrel 27. As shown in FIG'S. 2 and 3, mandrel 27 is a tubular member, having a generally cylindrical wall 29 and an axial bore 31 that extends therethrough co-axial with the axis of the passage 21. Wall 29 has an enlarged area 29a that is closely received in the bushing 25. A plurality of slots 33 (FIG. 3), of which there are three in the preferred embodiment, extend from the upper edge of the mandrel 27 to a point just above the enlarged area 29a. Each slot 33 extends completely through the wall 29 to allow the wall 29 to expand radially outward. A plurality of serrations or teeth 35 are formed on the exterior of wall 29 at the upper end of the mandrel 27. Serrations 35 serve as gripping means for gripping the workpiece "W" within the hole 23. A flange 37 is formed on the lower end of mandrel 27. Flange 37 has a diameter larger than passage 21.

An expander stem 39 extends slightly through the bore 31 of mandrel 27. Stem 39 is a solid rod of metal having a tapered upper end 41, that is preferably frustoconical. Upper end 41 is larger in diameter than the bore 31 so that when stem 39 is pulled downwardly, it will cause the mandrel 27 to radially expand. Bore 31 is tapered at its upper edge to mate with the taper of upper end 41. Stem 39 has a plurality of threads 43 on its lower end. An upper lock nut 45 engages threads 43 and supports a washer or stop member 47. A coil spring 49 is located between the flange 37 and the washer 47. Rotating nut 45 moves washer 47 upwardly to compress the coil spring 49.

A lower nut 55 also engages the threads 43. The threads 43 of stem 39 extend into and threadingly engage a protruding portion of a piston 53. Nut 55 locates and locks the stem 39 to the piston 53. Piston 53 has a lower enlarged diameter portion (not shown) located within a hydraulic cylinder 57. Hydraulic cylinder 57 receives hydraulic fluid through lines 59. A pump 61 supplies hydraulic fluid to the hydraulic cylinder 57 to move the piston 53 upwardly and downwardly. A control valve 63 controls the direction of the hydraulic fluid flow. A pressure relief valve 65 limits the hydraulic pressure.

Figure 2:
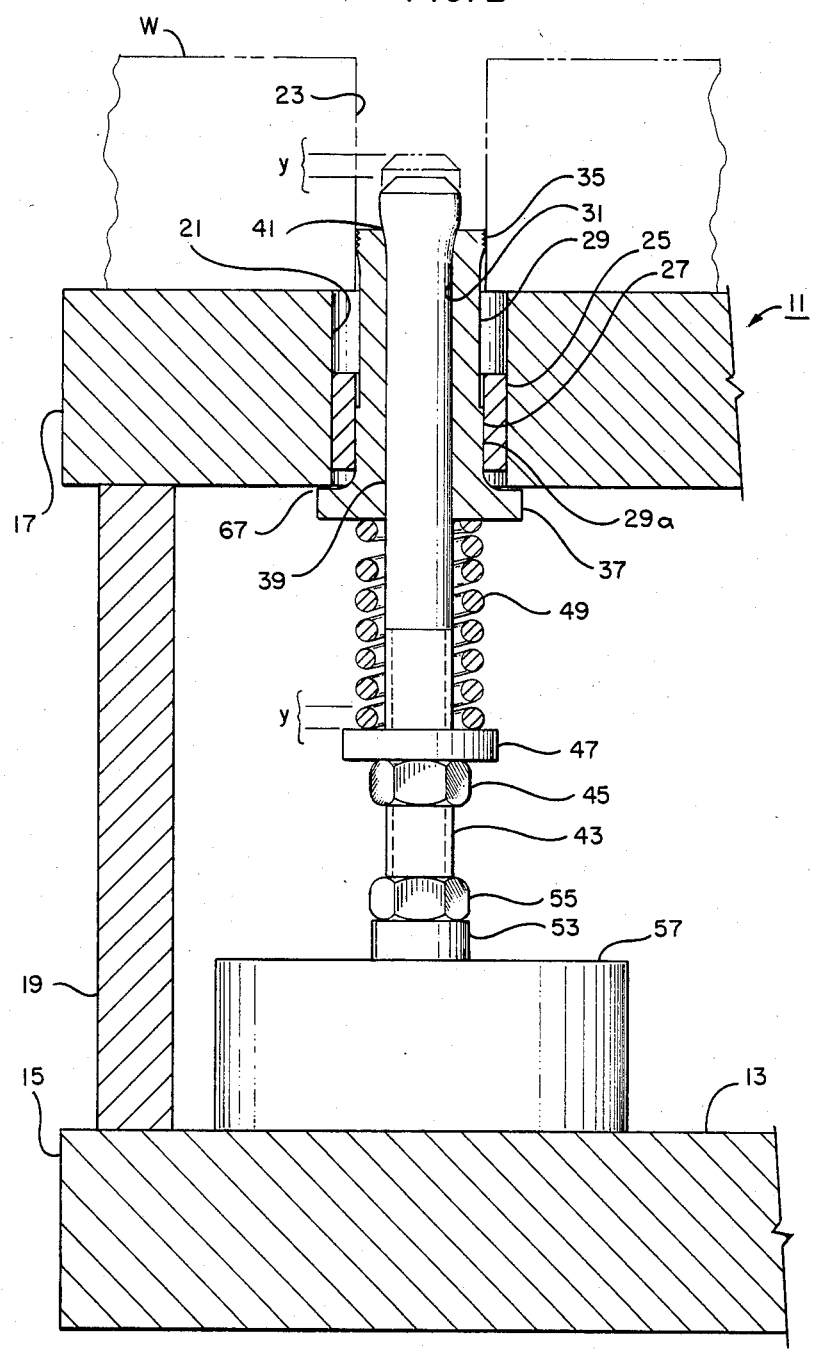
FIG. 2 is an enlarged view of a portion of the clamp of FIG. 1, and shown in the clamping position.

In assembling the hydraulic clamp 11, the hydraulic cylinder 57 will be mounted to base 15. Bushing 25, mandrel 27, stem 39 and the various components will be assembled as shown in FIG. 2. Hydraulic power is supplied to hydraulic cylinder 57 to move piston 53 to the top of its stroke. Stem 39 will be screwed into the piston 53 and upper lock nut 45 tightened to a position in which the upper edge of the mandrel 27 engages the lower point of the tapered end 41, and the upper side of flange 37 touches the lower side of support surface 17. The position will be selected such that any downward movement of stem 39 with respect to mandrel 27 will begin to expand the mandrel 27. Lower lock nut 55 will be secured to maintain the stem 39 at this position.

The upper lock nut 45 is then further tightened to compress the spring 49 to a desired preload. The upward force of the spring 49 on flange 37 of mandrel 27 must be sufficient to keep the mandrel from moving downward when the stem 39 starts to move downward, until the mandrel 27 has expanded into engagement with the workpiece "W". When preloaded to the desired amount, stem 39 will move downwardly slightly, and along with it piston 53. This causes mandrel 27 to expand radially a slight amount before hydraulic force is applied to move piston 53 downwardly.

In operation, first, a plurality of holes 23 are drilled in the workpiece "W", one hole 23 for each expander stem 39 and mandrel 27 assembly located in fixture 13. The workpiece "W" then is placed on the support surface 17 of the fixture 13. The mandrel serrations 35 will be spaced slightly inward from the wall of the hole 23 initially. Mandrel 27 will have an upward force imposed upon it by the spring means or coil spring 49. The upward travel of mandrel 27 will be limited by the stop means comprising the upper surface of the flange 37 in contact with the lower surface of support surface 17. Then, hydraulic pressure is supplied through lines 59 to the upper side of piston 53 in hydraulic cylinder 57. This causes the piston 53 to move downwardly. Initially, mandrel 27 will not move downwardly because of the force of the spring 49.

The movement of stem 39 with respect to mandrel 27 causes the upper end of the mandrel to radially expand, with serrations 35 biting into the wall of hole 23 in workpiece "W". The lower end of the spring 49 moves downwardly in unison with stem 39 because washer 47 is rigidly secured to the stem 39. The upward force of the spring 49 begins to decrease as the spring elongates due to downward movement of the stem 39. Eventually, the hydraulic force pulling downward on stem 39 will exceed the declining upward force imposed by the spring 49 on mandrel flange 37, causing mandrel 27 to also move downwardly until a selected hydraulic pressure is reached. This downward movement of mandrel 27 does not occur, however, until the serrations 35 have tightly gripped the workpiece "W". Workpiece "W" does not move downward with mandrel 27. The serrations 35 deform the wall of hole 23 slightly. The downward movement of mandrel 27 is slight, about 0.010 inch in the preferred embodiment for an aluminum workpiece "W". This results in a clearance 67 between the upper edge of flange 37 and the lower side of the fixture support surface 17. The downward travel of mandrel 27 is completely unobstructed, and stops only when the hydraulic cylinder 57 reaches the selected maximum pressure set by pressure relief valve 65. The selected maximum hydraulic pressure on stem 39 is maintained during machining and will be transmitted to the mandrel 27, which transmits the force to the workpiece "W", to tightly secure the workpiece to the support surface 17. The downward travel of stem 39 and stop washer 47 is indicated in FIG. 2 by the symbol "y" and by the phantom lines.

Hydraulic force will be maintained on the stem 39 until the machining operations are finished on the workpiece "W". Then, the control valve 63 is switched to the opposite position, applying hydraulic pressure to the lower side of piston 53 to cause the piston 53 to move upwardly. As the stem 39 moves upwardly, the resiliency of mandrel 27 causes its wall 29 to move inwardly to return to the unlocked position. The workpiece "W" can be moved simply by lifting upward. Once in the upper position, as shown in FIG. 1, the preload force on the spring 49 will again return to the selected amount.

In the preferred embodiment, the hole 23 in workpiece "W" is preferably one inch. The outer diameter of mandrel 27 at serrations 35 is initially about 0.960 inch. The preload force on coil spring 49 is preferably 800 pounds and this causes the stem 39 to move downwardly slightly, expanding the mandrel 27 to a diameter at serrations 35 of about 0.980 inch. The taper of upper end 41 is 20 degrees. The distance "y" varies with the maximum hydraulic pressure and the workpiece "W". The preferred maximum hydraulic pressure is 500 psi (pounds per square inch) and the maximum piston stroke is preferably 0.250 inch. The piston 53 will normally not move downwardly more than two-thirds of its stroke before the maximum hydraulic pressure is reached.

The invention has significant advantages. The hydraulic clamp is fast and simple to use. In multiples, the clamp provides sufficient holddown force for heavy cutting operations. The clamp does not protrude above the surface of the workpiece. The same clamp can be used with many different types of machining operations.

While the invention has been shown in only one of its forms, it should be apparent to those skilled in the art that it is not so limited but is susceptible to various changes without departing from the scope of the invention.

I claim:

1. A device for securing a workpiece to a support surface of a fixture for performing machining operations, comprising:

a mandrel adapted to be carried in a passage provided in the fixture support surface and having an upper end that is expansible and is adapted to extend into a hole provided in the workpiece, the mandrel having a flange on its lower end that is larger in diameter than the passage;

an expander stem carried within a bore of the mandrel, having an upper end that protrudes past the upper end of the mandrel and is adapted to be recessed within the hole in the workpiece, the upper end of the stem being tapered and larger in diameter than the bore of the mandrel;

hydraulic means for pulling downwardly on the stem with hydraulic force; and spring means for applying an upward force on the mandrel, causing the flange to bear against the lower side of the support surface while the stem is in an upper position, to initially prevent downward movement of the mandrel to expand the upper end of the mandrel into gripping engagement with the workpiece as the stem moves downwardly, the hydraulic force subsequently pulling the mandrel downwardly with the stem after the mandrel grips the workpiece, for tightly securing the workpiece to the support surface, the device being free of any structure below the flange for stopping movement of the mandrel once the stem begins pulling the mandrel downwardly.

2. The device according to claim 1 wherein the mandrel is free to move downwardly once the force of the spring is overcome, until a selected hydraulic pressure is reached.

3. The device according to claim 1 wherein the mandrel has serrations formed on its upper end for gripping the workpiece.

4. The device according to claim 1 further comprising a bushing encircling the mandrel within the passage in the fixture support surface.

5. A device for securing a member to a support surface, comprising:

a tubular radially expansible mandrel adapted to be carried in a passage provided in the support surface and adapted to extend into a hole provided in the member, the mandrel having a flange on its lower end of diameter larger than the passage diameter to limit upward movement of the mandrel;

an expander stem carried within a bore of the mandrel, having an upper end that protrudes past the mandrel, the upper end of the stem being tapered and larger in diameter than the bore of the mandrel;

spring means for applying an upward force on the mandrel, causing the flange of the mandrel to bear against the lower side of the support surface while the stem is in an upper position, the spring means including a coil spring having an upper end that engages the flange of the mandrel and a lower end that engages a stop carried by the stem for movement therewith, the stop being positioned to compress the spring and provide an upward preload force on the mandrel prior to engagement of the member by the mandrel; and hydraulic means for pulling the stem downwardly with hydraulic force, the preload force being selected to cause the mandrel to remain axially stationary as the stem and lower end of the spring begin to move downwardly, until the mandrel grips the member, at which point the mandrel moves downwardly to pull the member into tight contact with the support surface until a selected hydraulic force is reached, the device being free of any structure below the flange for stopping movement of the mandrel once the stem begins pulling the mandrel downwardly.

6. The device according to claim 5 wherein the stop on the stem is adjustable axially relative to the stem for varying the preload force of the spring.

7. A device for securing a workpiece for performing machining operations, comprising in combination:

a fixture having a base and a support surface spaced apart and separated by supporting members, the support surface having at least one passage therethrough, which has an axis adapted to align with a hole provided in a workpiece;

a tubular, metal mandrel having a plurality of vertical slots in an upper end thereof to allow expansion, the upper end protruding through the passage and having an exterior surface at the upper end with serrations formed thereon for gripping a sidewall of the hole in the workpiece, the mandrel having a flange on its lower end that is larger in diameter than the passage;

an expander stem carried within a bore of the mandrel, having an upper end that protrudes past the upper end of the mandrel and is adapted to be recessed within the hole in the workpiece, the upper end of the stem being tapered and larger in diameter than the bore of the mandrel, the stem having a threaded portion located below the upper end;

a stop washer supported by a nut that engages the threaded portion, the distance from the stop washer to the supporting surface being adjustable by rotating the nut;

a coil spring encircling the stem and compressed between the mandrel and the washer to a selected preload force that urges the flange of the mandrel against the lower side of the support surface while the expander stem is in an upper position; and a hydraulic piston and cylinder mounted on the base and connected to the lower end of the stem for moving the stem downwardly, the preload force being selected to cause the mandrel to remain axially stationary as the stem begins to move downwardly until the serrations begin gripping the workpiece, the mandrel then moving downwardly free of obstructions until a selected hydraulic force is reached and a slight clearance exists between the flange of the mandrel and the lower side of the support surface, the device being free of any structure below the flange for stopping movement of the mandrel once the stem begins pulling the mandrel downwardly.

8. The device according to claim 7 further comprising a bushing encircling the mandrel within the passage in the fixture support surface.

* * * * *